US008718260B2

(12) United States Patent
Srinivasa-Murthy et al.

(10) Patent No.: US 8,718,260 B2
(45) Date of Patent: *May 6, 2014

(54) METHOD, COMPUTER PROGRAM PRODUCT, AND APPARATUS FOR TRANSFERRING A CALL AND ASSOCIATED DATA AND AN ASSOCIATED SYSTEM THEREOF

(75) Inventors: Chandrashekar Srinivasa-Murthy, Tampa, FL (US); Achuta Rebala, Vishakapatnam (IN); Vijayanand Arumugam, Wesley Chapel, FL (US); Santosh Bijur, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,656

(22) Filed: Apr. 9, 2012

(65) Prior Publication Data

US 2012/0195411 A1    Aug. 2, 2012

Related U.S. Application Data

(63) Continuation of application No. 11/694,554, filed on Mar. 30, 2007, now Pat. No. 8,155,300.

(51) Int. Cl.
*H04M 7/00* (2006.01)

(52) U.S. Cl.
USPC ............ 379/220.01; 379/221.01; 379/221.14; 379/265.11; 379/272; 379/273; 379/265.02

(58) Field of Classification Search
USPC ............ 379/265.01, 207.01, 207.14, 265.02, 379/265.09, 210.03, 211.01, 211.02
See application file for complete search history.

(56) References Cited

U.S. PATENT DOCUMENTS

| 6,044,144 | A | 3/2000 | Becker et al. |
| 6,473,505 | B1 | 10/2002 | Khuc et al. |
| 7,162,021 | B1 | 1/2007 | Johnson et al. |
| 7,830,792 | B1 | 11/2010 | Khuc et al. |
| 2006/0188078 | A1 | 8/2006 | Jordan et al. |
| 2007/0036332 | A1 | 2/2007 | Busayapongchai |

OTHER PUBLICATIONS

Rosen at al., "Multiprotocol Label Switching Architecture, RFC 3031," Network Working Group, The Internet Society, pp. 1-61, Jan. 2001.

*Primary Examiner* — Joseph J Nguyen

(57) ABSTRACT

A method, computer program product, and an apparatus for transferring a telephone call and associated data from an IVR system to a live agent or other system are provided. An exemplary embodiment may include a voice portal of the IVR system requesting an access number for a live agent and sending data associated with the telephone call to a CTI system. The CTI system may request and receive a routing label from a router and then send the data associated with the telephone call and the request for an access number to a call center using the routing label provided by the router. The CTI system may receive the access number from the call center and send the access number back through the IVR system to an exchange carrier for transferring the caller to the call center.

15 Claims, 4 Drawing Sheets

METHOD, COMPUTER PROGRAM PRODUCT, AND APPARATUS FOR TRANSFERRING A CALL AND ASSOCIATED DATA AND AN ASSOCIATED SYSTEM THEREOF

RELATED APPLICATIONS

This application is a continuation of U.S. patent application Ser. No. 11/694,554, titled "METHOD, COMPUTER PROGRAM PRODUCT, AND APPARATUS FOR TRANSFERRING A CALL AND ASSOCIATED DATA AND AN ASSOCIATED SYSTEM THEREOF," filed on Mar. 30, 2007, which is hereby expressly incorporated by reference.

BACKGROUND INFORMATION

Many businesses and other entities provide at least some form of customer service to their customers through the telephone. For example, some businesses provide call centers manned with hundreds of agents to answer calls from customers. Each agent may have access to information regarding the customer through a computer or network terminal.

A common complaint for a customer calling a call center is the wait time, especially for a customer calling for a routine matter. Although a business may reduce wait times by employing more live agents, increasing the number of agents can be costly. Rather than exclusively relying on more live agents, interactive-voice response (IVR) systems have been developed. In general, the IVR system allows the customer to access and request information through voice commands to an automated system rather than to a live agent.

Although an IVR system may provide some services to a customer that used to be provided through a live agent, at times a customer still wants to leave the IVR system and talk to a live agent. In such circumstances, it may be necessary to transfer the customer from the IVR system to the call center. Also, it would help the live agent and the customer if any information generated or edited by the customer through the IVR system was accessible to the live agent when the customer is transferred.

BRIEF DESCRIPTION OF THE SEVERAL VIEWS OF THE DRAWING(S)

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Figure 1:
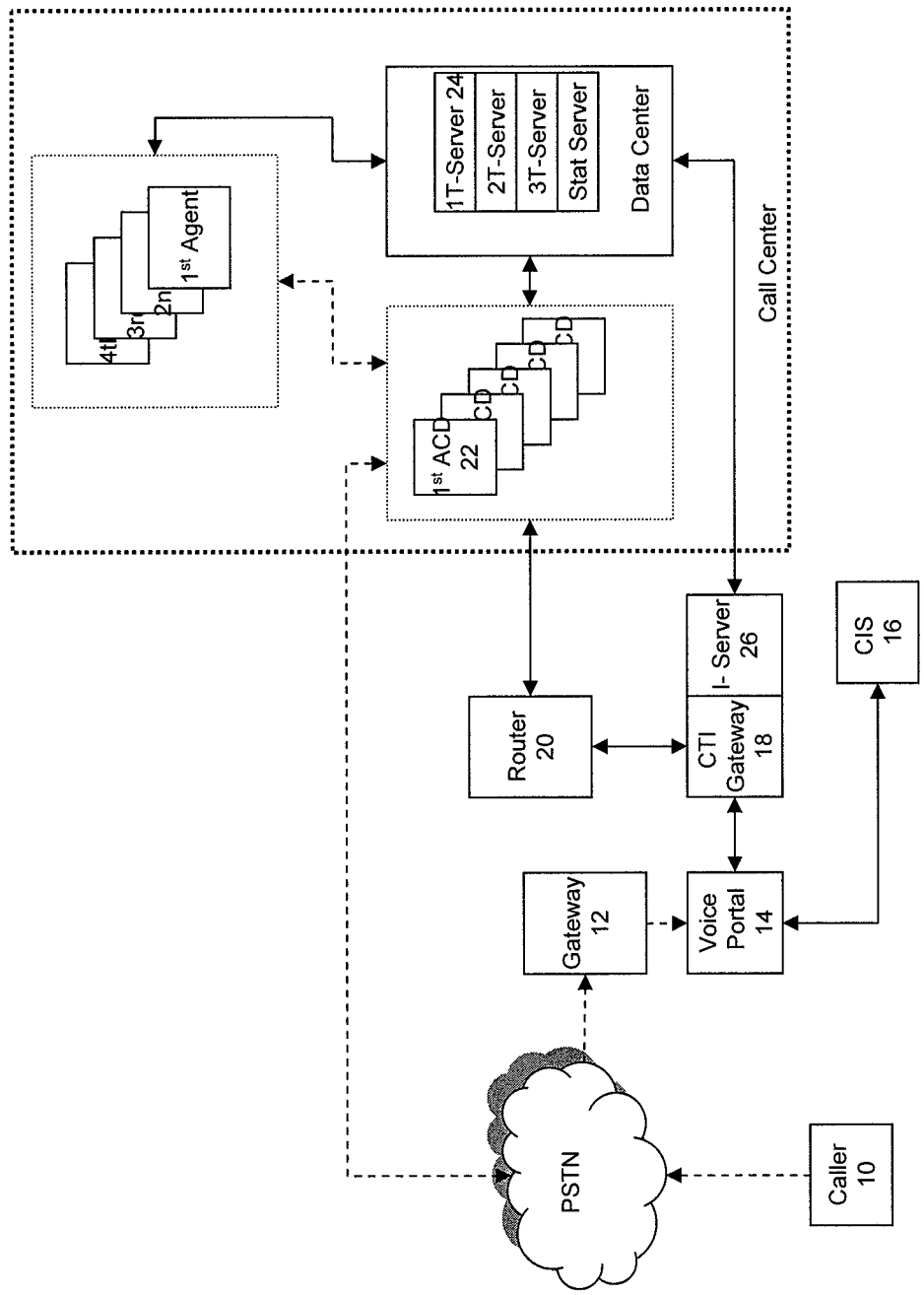
FIG. 1 illustrates a block diagram of a system consistent with an exemplary embodiment.
Figure 2:
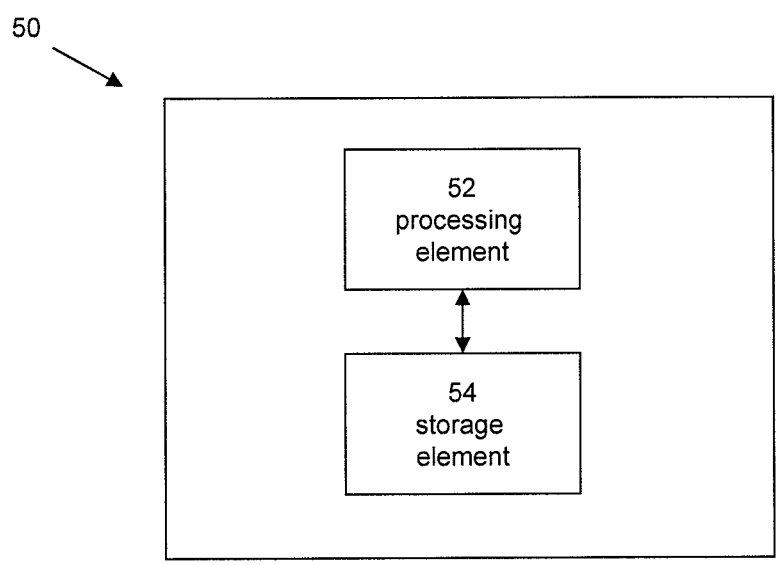
FIG. 2 illustrates a block diagram of an apparatus according to an exemplary embodiment.

Referring to FIG. 1, a system may be provided for rerouting a call and data associated with the call to an agent at a call center from an interactive-voice response ("IVR") system. While a particular embodiment is described that contemplates a call being delivered by a public switching telephone network ("PSTN"), other embodiments are also contemplated include those that receive calls wirelessly or via a packet-switched network, such as a Voice over Internet Protocol. In the illustrated embodiment, a customer may use a first telephone device 10 to call a telephone number, such as 1-800-Verizon, and be routed to an IVR system through the PSTN by an exchange carrier, or more specifically an inter-exchange carrier ("IXC") and/or a local exchange carrier ("LEC"). The call of the customer is referred to herein as "the telephone call." As noted above, this telephone call may be delivered to the IVR system in different manners such as via a wireless network or via a packet switched network by means on VoIP.

The IVR system may include a gateway 12, a voice portal 14, and one or more speech-directed applications, generally referred to herein as customer information services 16 ("CIS"). The telephone call enters the IVR system through the gateway 12. The gateway 12 of the IVR system may be configured to control, monitor, or process a plurality of incoming and outgoing telephone calls to and from the IVR system. The gateway 12 may also switch the incoming and outgoing telephone calls between language or signal protocols. For example, the gateway may be configured to switch the incoming digitized analog voice signal and an associated signaling system 7 ("SS7") of the telephone call to an analog voice signal, such as a VoIP signal for processing and routing of the analog voice signal through the IVR system. An example of a gateway 12 of the IVR system is an access-server, such as Cisco 5850 Universal Gateway offered by Cisco Systems Inc. of San Jose, Calif.

The telephone call of this exemplary embodiment is passed as a VoIP signal to the voice portal 14 of the IVR system to access the customer information services 16. The customer information services 16 may allow the customer or caller to access information or provide information by vocal commands or responses made by the caller to the voice portal 14. For example, the caller may have access to account information, order status, or other information or may request fund transfers, bill payment, order request, or make another request. The interaction between the caller and the IVR system may generate or modify data relating to the caller or, more specifically, to accounts, orders, queries, or other information associated with the caller.

The IVR system provides the capability for the customer or caller to end the CIS and request to speak with a live operator or agent. Upon such a request, at least some of the data associated with the caller is routed to the live agent through a CTI system and the caller or, more particularly, the telephone call is routed to the live agent through the PSTN or other supporting network. As an example, the CTI system may be a Genesys CTI system offered by Genesys an Alcatel-Lucent Company of Daly City, Calif.

In particular, when a request is made for a live agent, the Voice Portal 14 may pass at least some of the data associated with the caller to a CTI gateway 18 of the CTI system and request an access number. The Voice Portal 14 may also pass data specific to the telephone call to the CTI gateway 18. In general, the data specific to the telephone call may assist in determining the optimal routing path for the telephone call to the live agent. The data specific to the telephone call may include fields such as a message type, a directory number ("DN"), a TrunkGroup, a TransferGroup, a post answer call routing ("PACR"), a MessageOriginator, a Unique Call Identifier ("UCI"), and DateTime. Data specific to the telephone call and information associated with the caller is collectively referred to herein as "data associated with the telephone call."

The CTI gateway 18 requests a routing label from a router 20. For example, the router may be an intelligent contact management ("ICM") router offered by the Cisco Systems, Inc. The router 20 determines the routing path for the telephone call and generates a routing label that defines the routing path. The determination of the router 20 may be based on determining the availability of live agents at a call center and/or statistics regarding the assets at the call center, as well as data associated with the telephone call. Notably, however, the router does not actually route the telephone call, but instead provides a routing path such that other system elements can appropriately route the telephone call and the data associated with the telephone call.

The call center may comprise a data center and at least one automatic call distributor 22 ("ACD"). Each ACD 22 is configured to distribute incoming telephone calls to a group of live agents. The router determines which ACD 22 has the best available live agents and selects that ACD as the "destination ACD" for the telephone call.

The data center may include one or more servers such as a transaction server 24 ("T-Server") and a statistical server. The router may access one or more servers at the data center to determine the routing path. It should be understood that the individual elements of the call center may be co-located or be located at one or more separate locations.

The router 20 delivers the routing label to the CTI gateway 18. The CTI gateway 18 creates a call context from the routing label and at least some of the data associated with the telephone call or the customer and sends a request to a first intermediate server 26 ("I-server") of the CTI system for an access number.

The I-server 26 requests and receives the access number from the T-server 24. The I-server 26 passes the access number to the Voice Portal 14 via the CTI gateway 18. And the Voice Portal 14 passes the access number to the exchange carrier via the gateway 12 of the IVR system. The exchange carrier reroutes the telephone call based on the access number to the destination ACD 22, selected by the router and identified by the routing label. The destination ACD 22 receives routing instructions from the T-server 24 and delivers the call to a particular live agent. For example, the live agent may be selected based on a criterion such as longest available agent. The data associated with the customer is accessible or deliverable to the live agent from the IVR system through the CTI system using the routing label provided by the router.

Although the system and method is described herein as transferring a telephone call from a IVR system to a live agent, the system and/or method may also include transferring a telephone call from a first IVR system to a second IVR system.

The system may be may be implemented using a combination of hardware, software, and/or firmware. In particular, it is understood that even though the system is described primarily herein as including a number of specialty purpose computing devices, at least portions of the overview system may be implemented using a plurality of general purpose computers or servers configured to perform one or more of the operations described herein. For example and referring to FIG. 3, a computer 50 may include a processing element 52 and one or more storage elements 54. The processing element 52 may be configured to perform one or more operations described herein and may be embodied in many ways. For example, the processing element 52 may be embodied as a processor, a coprocessor, a controller or various other processing means or devices including integrated circuits such as, for example, an application specific integrated circuit ("ASIC"). The storage element or elements 54 may be various memory devices including volatile and non-volatile memory devices. A storage element 54 may be configured to store information, data, applications, instructions or the like for enabling the processing element 52 to carry out various functions upon execution thereof in accordance with exemplary embodiments. For example, the storage element 54 could be configured to buffer input data for processing by the processing element 52.

Figure 4:
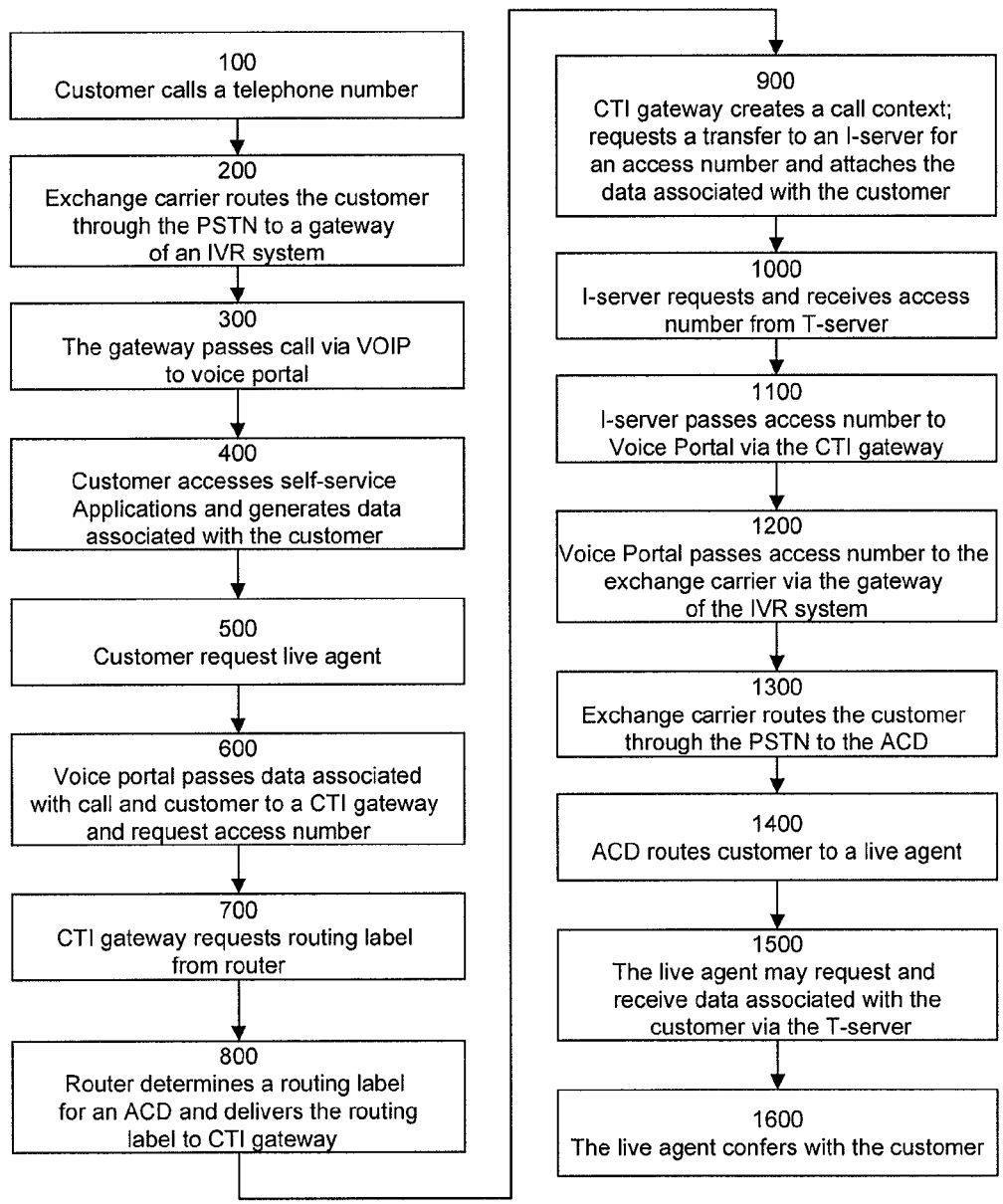
FIG. 4 illustrates a flow chart of a method consistent with an exemplary embodiment.

Referring to FIG. 4, a method performed by the CTI gateway and, in particular, performed by a processing element of the CTI gateway that operates under control of software, according to an exemplary embodiment may include receiving data associated with a telephone call and a request for an access number from a voice portal of an interactive-voice response system 2000. The method may further include sending a request to a router for a routing label 2100 and receiving the routing label from the router 2200. Another operation may include initiating routing of at least some of the data associated with the telephone call at least partly in accordance with the routing label but in a manner independent of the router 2300. Other operations may include sending a request for an access number to another device other than the router 2400, such as an I-server, a T-server or the like, and receiving the access number from the device other than the router 2500. In response to receiving the access number, the access number may be sent to the voice portal 2600.

As explained above, the access number may be used for transferring the telephone call to a call center and the routing label may be used for determining the destination ACD and for transferring the data associated with the telephone call to the call center. Requesting and receiving a routing label from the router and then sending the call context to the call center through another device of the CTI system other than the router helps to separate the operations of determining an effective routing path to the call center and transferring the data associated data with the telephone call to the call center. In particular, the router may be specifically configured to determine the most effective routing path or paths and have limited capabilities for transferring the data, while the CTI system may be specifically configured for transferring data and have limited capabilities for determining a routing path. Therefore separating the operations of determining the routing path and the data transferring allows for the system to utilize the specific configurations of the different devices and not necessarily rely on any of the limited capabilities of one of the devices.

A more specific implementation of the overall method consistent with the embodiment depicted in FIG. 1 is shown in FIG. 4 and described below by way of further example. In particular, the method of FIG. 4 may include a customer calling a telephone number 100. An exchange carrier may route the customer through the PSTN to a gateway of an IVR system 200. The gateway may be configured to pass the call to a voice portal through a packet switched network, such as via VoIP 300. The customer can access one or more self service applications and generating data associated with or otherwise characterizing the customer or telephone call 400. The customer can also request a live agent 500. In response to a request for a live agent from the customer, the voice portal is configured to pass the data associated with the telephone call to a computer telephony integration ("CTI") gateway and request an access number 600. The CTI gateway requests a routing label from a router 700. And the router determines a routing label for a destination automatic call distributor ("ACD") of a cell center and delivers the routing label to the CTI gateway 800. The CTI gateway is configured to send the routing label and data associated with the telephone call to an I-server and request the access number 900. The I-server requests and receives an access number from a T-server associated with the destination ACD and transfers the data associated with the telephone call to the T-server 1000. The I-server passes the access number to the voice portal via the CTI gateway 1100. And the voice portal passes the access number to the exchange carrier via the gateway of the IVR system 1200. The exchange carrier routes or transfers the customer through the PSTN to the destination ACD 1300. The ACD routes the call to the live agent 1400. The live agent may request and receive the data associated with the telephone call via the T-server 1600. The live agent may confer with the customer 1700.

Figure 3:
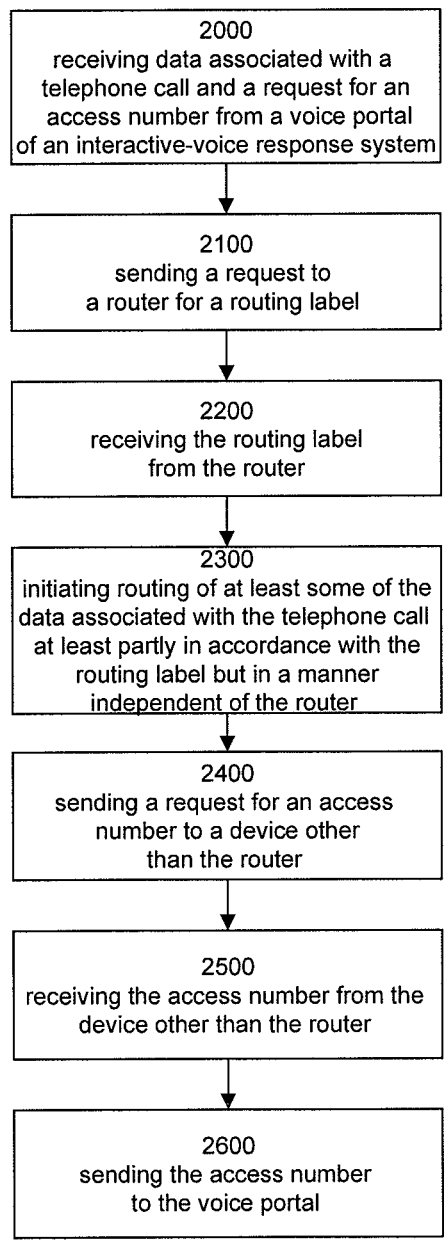
FIG. 3 illustrates a flow chart of a method according to an exemplary embodiment.

It is understood that the operations described for the illustrated methods of FIGS. 3 and 4 may be performed through hardware, software, or combination thereof. Therefore embodiments may take the form of hardware systems and/or apparatuses, software, or combinations thereof. As an example, embodiments may include a computer program product stored on a computer-readable storage medium (i.e. software) comprising of one or more executable portions for performing the operations described herein. As another example, processor elements of one of the gateway, voice portal, CTI gateway, router, I-server, and T-server may be configured to perform one or more of the operations illustrated in FIG. 4 or described above.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A method comprising:
 receiving data associated with a telephone call from a voice portal of an interactive-voice response system;
 sending a request to a router for a routing label identifying a destination automatic call distributor;
 receiving the routing label from the router; and
 initiating routing of at least some of the data associated with the telephone call to the destination automatic call distributor at least partly in accordance with the routing label but in a manner independent of the router.

2. The method of claim 1 further comprising receiving a request for an access number from the voice portal.

3. The method of claim 2 further comprising sending a request to a device other than the router for the access number of the destination automatic call distributor, the request at least partially in accordance with the routing label.

4. The method of claim 3 further comprising receiving the access number.

5. The method of claim 4 further comprising sending the access number to the voice portal.

6. A computer program product comprising a computer-readable non-transitory storage medium having computer-readable program code portions stored therein, the computer-readable program code portions comprising:
 a first executable portion configured to receive data associated with a telephone call from a voice portal of an interactive-voice response system;
 a second executable portion configured to send a request to a router for a routing label;
 a third executable portion configured to receive the routing label identifying a destination automatic call distributor; and
 a fourth executable portion configured to initiate routing of at least some of the data associated with the telephone call to the destination automatic call distributor at least partially in accordance with the routing label but in a manner independent of the router.

7. The computer program product according to claim 6 further comprising a fifth executable portion for receiving a request for an access number from the voice portal.

8. The computer program product according to claim 7 further comprising a sixth executable portion for sending a request to a device other than the router for the access number of the destination automatic call distributor, the request at least partially in accordance with the routing label.

9. The computer program product according to claim 8 further comprising a seventh executable portion for receiving the access number.

10. The computer program product according to claim 9 further comprising an eighth executable portion for sending the access number to the voice portal.

11. An apparatus comprising:
 a processor configured to receive data associated with a telephone call and request an access number from a voice portal of an interactive-voice response system; to send a request to a router for a routing label identifying a destination automatic call distributor; to receive the routing label from the router; and to initiate routing of at least some of the data associated with the telephone call to the destination automatic call distributor at least partly in accordance with the routing label but in a manner independent of the router.

12. The apparatus according to claim 11, wherein the processor is further configured to receive a request for an access number from the voice portal.

13. The apparatus according to claim 12, wherein the processor is further configured to send a request to a device other than the router for the access number of the destination automatic call distributor, the request at least partially in accordance with the routing label.

14. The apparatus according to claim 11, wherein the processor is further configured to receive the access number.

15. The apparatus according to claim 11, wherein the processor is further configured to send the access number to the voice portal.

* * * * *